UNITED STATES PATENT OFFICE.

ALFRED E. WATERS, OF PHILADELPHIA, PENNSYLVANIA.

LAXATIVE COMPOUND.

SPECIFICATION forming part of Letters Patent No. 392,382, dated November 6, 1888.

Application filed August 15, 1888. Serial No. 282,816. (No specimens.)

*To all whom it may concern:*

Be it known that I, ALFRED E. WATERS, a citizen of the United States, residing at Philadelphia, in the county of Philadelphia and State of Pennsylvania, have invented certain new and useful Improvements in Medical Compounds; and I do declare the following to be a full, clear, and exact description of the invention, such as will enable others skilled in the art to which it appertains to make and use the same.

My composition consists of the following ingredients, combined in the proportions stated, namely: Senna-leaves, (*Cassia senna,*) eight parts; lobelia, (*Lobelia inflata,*) two parts; fire-weed, (*Erechthites hieracifolia,*) six parts; balmony, (*Chelone glabra,*) two and one-half parts; lungwort, (*Pulmonaria Virginica,*) two parts; dog-grass, (*Triticum repens,*) five parts. Of the senna or *Cassia senna* I use the leaves, and of the fire-weed I also use the leaves, while I use the seeds of the other ingredients, respectively, with the exception of the dog-grass, of which I use the stalks. These ingredients are to be thoroughly mixed together and well ground.

To make a tea, I take a teaspoonful of the herbs, thus ground and mixed, and steep them in about a teacupful of water, and after cooling strain them well, when a gentle aperient and diuretic will be had.

For constipation, the tea should be drank when going to bed. For dyspepsia, a swallow should be taken after each meal, and for piles enough of the tea should be taken each morning to produce stools in the evening.

Having described my invention, what I claim is—

The herein-described composition of matter to be used for an aperient or laxative, consisting of senna-leaves, lobelia, fire-weed, balmony, lungwort, and dog-grass, in the proportions substantially as specified.

In testimony whereof I affix my signature in presence of two witnesss.

ALFRED E. WATERS.

Witnesses:
CLARKE F. HESS,
GEO. W. REED.